United States Patent [19]

Belter

[11] Patent Number: 5,215,315

[45] Date of Patent: Jun. 1, 1993

[54] GASKET HAVING THERMALLY INSULATED PORT CLOSURE ASSEMBLY

[75] Inventor: Jerome G. Belter, Mt. Prospect, Ill.

[73] Assignee: Dana Corporation, Toledo, Ohio

[21] Appl. No.: 792,373

[22] Filed: Nov. 15, 1991

[51] Int. Cl.$^5$ ............................................. F16T 15/32
[52] U.S. Cl. ................................. 277/235 B; 277/22; 277/181; 277/227
[58] Field of Search ..................... 277/22, 181, 235 B, 277/227, 26 235 R, 233

[56] References Cited

U.S. PATENT DOCUMENTS

| | | |
|---|---|---|
| 1,557,775 | 10/1925 | Robertson . |
| 1,565,918 | 12/1925 | Fitzgerald . |
| 2,519,436 | 8/1950 | Cadman . |
| 3,108,818 | 10/1963 | Furstenburg . |
| 3,565,449 | 2/1971 | Ascencio et al. . |
| 3,668,036 | 6/1972 | Farnam ........................... 277/235 B |
| 3,866,926 | 2/1975 | Traum . |
| 4,036,191 | 7/1977 | Numata et al. . |
| 4,126,318 | 11/1978 | Belter . |
| 4,223,897 | 9/1980 | Staab et al. ........................ 277/235 B |
| 4,312,512 | 1/1982 | Conte et al. . |
| 4,351,534 | 9/1982 | McDowell ....................... 277/235 B |
| 4,405,138 | 9/1983 | Skrycki . |
| 4,505,486 | 3/1985 | Skrycki . |
| 4,519,619 | 5/1985 | Doyle .............................. 277/235 B |
| 4,534,572 | 8/1985 | Belter . |
| 4,676,514 | 6/1987 | Beutter et al. . |
| 4,767,515 | 6/1987 | Cobb ............................... 277/235 B |
| 4,810,454 | 3/1989 | Belter . |
| 4,861,046 | 8/1989 | Udagawa . |
| 5,022,431 | 6/1991 | Grey et al. ....................... 277/235 B |

FOREIGN PATENT DOCUMENTS 2092244 8/1982 United Kingdom .

Primary Examiner—William A. Cuchlinski, Jr.
Assistant Examiner—Daniel G. DePumpo
Attorney, Agent, or Firm—MacMillan, Sobanski & Todd

[57] ABSTRACT

A gasket having a closure assembly secured over a port formed through the body thereof for thermally sealing and insulating the intake manifold from the cylinder head is disclosed. The closure assembly is formed from a metallic baffle plate, a thermal barrier plate formed from a heat insulating material, and a sealing plate formed from a material which is a relatively good heat conductor and which is resistant to degradation from high temperatures. The baffle plate is formed having a first plurality of tabs which extend outwardly therefrom in a co-planar manner, a second plurality of tabs which extend upwardly from the plane thereof, and a third plurality of tabs which extend downwardly from the plane thereof. The sealing plate is disposed adjacent to the lower surface of the baffle plate. The downwardly extending tabs of the baffle plate are bent inwardly over the outer peripheral edge of the sealing plate so as to secure it thereto. The thermal barrier plate is disposed adjacent to the upper surface of the baffle plate. The upwardly extending tabs of the baffle plate extend through the port and are bent outwardly over the upper surface of the gasket to retain the thermal barrier plate between the baffle plate and the gasket body, and to secure the closure assembly to the gasket body to form the gasket.

9 Claims, 3 Drawing Sheets

GASKET HAVING THERMALLY INSULATED PORT CLOSURE ASSEMBLY

BACKGROUND OF THE INVENTION

This invention relates in general to gaskets for providing a seal between two mating components and in particular to an improved gasket having a closure assembly secured over a port formed therethrough for thermally sealing and insulating one of the components from the other.

Gaskets are well known articles which are adapted to provide a relatively leak-proof seal between two mating components. Typically, the two components are formed having respective flat surfaces which are disposed adjacent to one another during use. During assembly of the components, a gasket is placed between the mating flat surfaces. Bolts or similar means are utilized to connect the two components together and compress the gasket between the mating surfaces. When compressed in this manner, the gasket effects a relatively leak-proof seal between the two components.

One common application for gaskets is between the intake manifolds and cylinder heads of internal combustion engines. Such manifold gaskets are typically formed having a plurality of ports or openings for accommodating the passage of various gases and fluids between the intake manifold and the cylinder head. For example, gasket ports are usually provided for permitting the flow of the gaseous fuel/air mixture and the fluid engine coolant through respective aligned passageways formed in the intake manifold and the cylinder head. The fuel/air mixture passing through the gasket intake port is typically relatively cool and in a vacuum state, while the engine coolant is typically quite hot and pressurized. Also, hot oil is sealed in the valleys of V-style engines. Thus, manifold gaskets are frequently exposed to a wide range of temperatures, pressures, and corrosive materials during normal use. Manifold gaskets are also typically provided with a peripheral sealing structure, such as a molded elastomeric bead, for providing a relatively leak-proof seal between the intake manifold and the cylinder head.

On internal combustion engines which are equipped with a carburetor or throttle body fuel injection apparatus, it is known to circulate hot exhaust gases from the cylinder head through the intake manifold. Such exhaust gas recirculation is performed to rapidly heat the intake manifold when the engine is cold so as to enhance the combustion process. To accomplish this, aligned passageways are formed in the intake manifold and the cylinder head to pass the exhaust gases therethrough. Consequently, it is known to provide a corresponding exhaust gas recirculation port through the gasket to accommodate this exhaust gas recirculation.

However, some internal combustion engines are equipped with a fuel injection apparatus which injects the fuel directly into the cylinder. In these types of engines, there is no need to heat the intake manifold. Thus, it is unnecessary to provide any exhaust gas recirculation through the intake manifold. Without the need for such heating, the intake manifold can be formed from non-metallic materials, such as plastic, which are otherwise susceptible to damage from heat. These non-metallic materials provide intake manifolds which are significantly lighter and less expensive than conventional metallic intake manifolds.

Unfortunately, for the sake of economy, vehicle manufacturers typically provide only a single cylinder head structure which is adapted for use in both types of engines, i.e., engines which do and do not recirculate hot exhaust gases through the intake manifold. Thus, these cylinder heads are usually all provided with a passageway for circulating the hot exhaust gases through the intake manifold. As mentioned above, the non-metallic intake manifolds of engines which do not employ such exhaust gas recirculation are often formed from plastic or similar materials which are susceptible to damage from heat. Thus, in those engines having non-metallic intake manifolds, it is necessary to provide some means for preventing the hot exhaust gases from contacting the intake manifold.

SUMMARY OF THE INVENTION

This invention relates to an improved gasket having a closure assembly secured over a port formed through the body thereof, such as an exhaust gas recirculation port, for thermally sealing and insulating the intake manifold from the cylinder head. The closure assembly is formed from a metallic baffle plate, a thermal barrier plate formed from a heat insulating material, and a sealing plate formed from a material which is a relatively good heat conductor and which is resistant to degradation from high temperatures. The baffle plate is formed having a first plurality of tabs which extend outwardly therefrom in a co-planar manner, a second plurality of tabs which extend upwardly from the plane thereof, and a third plurality of tabs which extend downwardly from the plane thereof. The sealing plate is disposed adjacent to the lower surface of the baffle plate. The downwardly extending tabs of the baffle plate are bent inwardly over the outer peripheral edge of the sealing plate so as to secure it thereto. The thermal barrier plate is disposed adjacent to the upper surface of the baffle plate. The upwardly extending tabs of the baffle plate extend through the port and are bent outwardly over the upper surface of the gasket to retain the thermal barrier plate between the baffle plate and the gasket body, and to secure the closure assembly to the gasket body to form the gasket.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
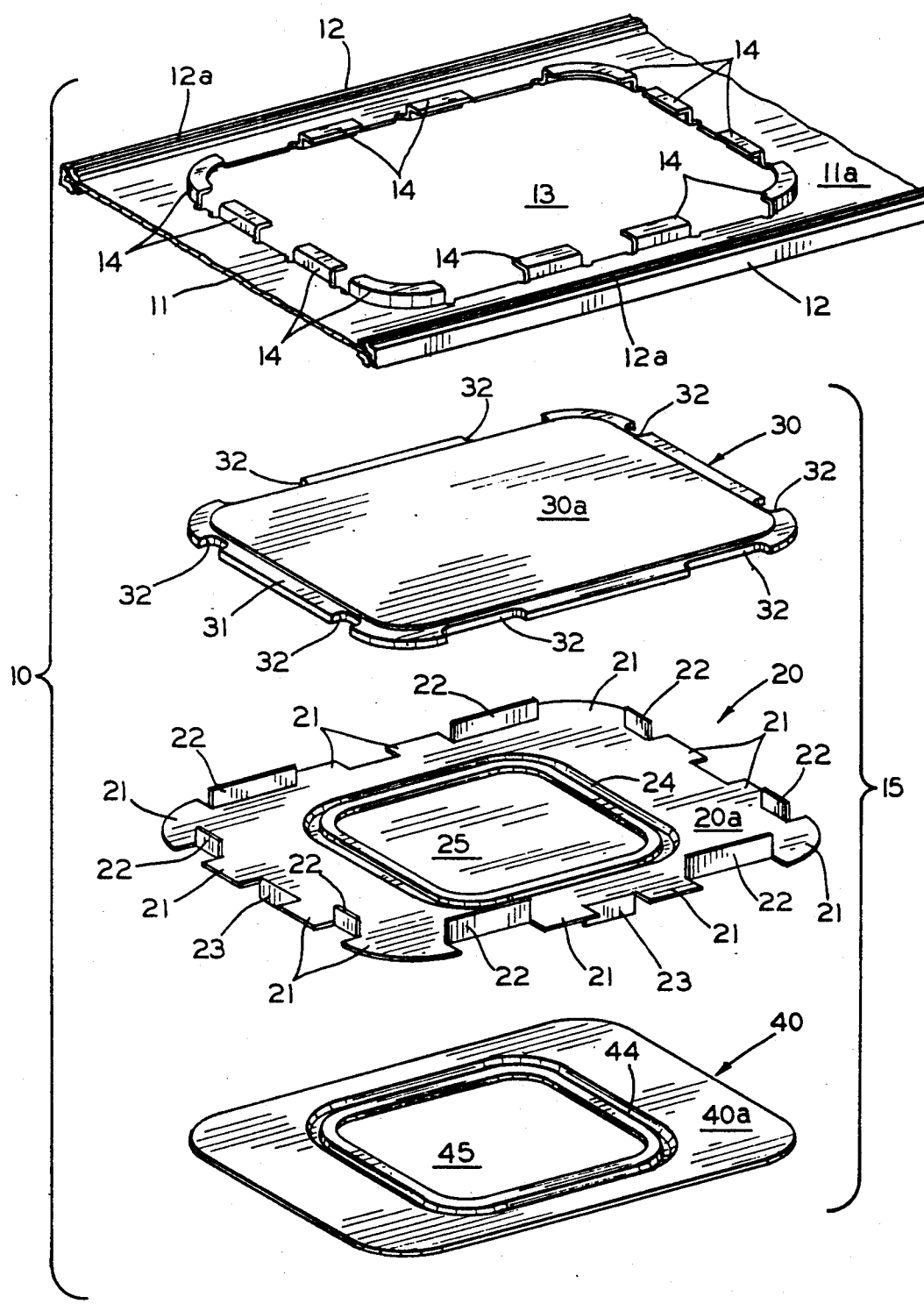
FIG. 1 is an exploded perspective view of a portion of an improved gasket in accordance with this invention.

Referring now to the drawings, there is illustrated in FIG. 1 a portion of a gasket, indicated generally at 10, in accordance with this invention. Although the gasket 10 will be described and illustrated in the context of a manifold gasket adapted for use between an intake manifold and a cylinder head of an internal combustion engine, it will be appreciated that the gasket 10 can be used in many other applications. The gasket 10 includes a metallic body or core plate 11 having opposed surfaces, which will be referred to as upper and lower surfaces 11a and 11b, respectively. If desired, a conventional sealing bead 12 may be secured to the core 11 about the periphery thereof and at other desired locations. The bead 12 is formed from a resilient material, such as a fluoroelastomer compound, and can be molded about the core 11. If desired, the sealing bead 12 may be formed having an embossment 12a extending thereabout.

Although not shown, the core 11 has a plurality of openings formed therethrough. Some of these openings function as ports for permitting the passage of various gases and liquids therethrough. Others of these openings function as holes for accommodating the passage of bolts or other means for securing the intake manifold to the cylinder head. The core 11 is further provided with an opening 13 which, in the illustrated embodiment, functions as an exhaust gas recirculation port, as described above. Although the port 13 is shown as being generally rectangular in shape, it will be appreciated that such port 13 can be formed having any desired shape. The core 11 and bead 12 thus far described are conventional in the art.

A plurality of tabs 14 is formed about the perimeter of the aperture 13. Each of the tabs 14 is formed having a first portion which extends upwardly from the upper surface of the core 11 and a second portion which extends parallel to the upper surface 11a of the core 11 inwardly over the port 13. In the illustrated embodiment, twelve tabs 14 are provided about the port 13. However, a greater or lesser number of such tabs 14 may be provided as desired. The function of these tabs 14 will be explained below.

A closure assembly, indicated generally at 15, is provided to be secured to the core 11 so as to close the port 13. As shown in FIG. 1, the closure assembly 15 is formed from three individual components. The first component is a flat, relatively thin baffle plate, indicated generally at 20. The baffle plate 20 is preferably formed from a metallic material, such as stainless steel or a steel alloy, defining an upper surface 20a and a lower surface 20b. The baffle plate 20 is formed having a first plurality of tabs 21 which extend outwardly therefrom in a co-planar manner. The baffle plate 20 is further formed having a second plurality of tabs 22 which are bent so as to extend upwardly from the plane thereof. Lastly, the baffle plate 20 is formed having a third plurality of tabs 23 which are bent so as to extend downwardly from the plane thereof. The functions of the various tabs 21, 22, and 23 will be explained below.

The central portion of the baffle plate 20 is formed having a recessed embossment 24 formed therein. In the illustrated embodiment, the recessed embossment 24 extends generally in the shape of a square, although other shapes may be formed if desired. Within this recessed embossment 24, a recessed area 25 is formed. In the illustrated embodiment, the recessed area 25 is also formed generally in the shape of a square. Both the recessed embossment 24 and the recessed area 25 are disposed below the plane defined by the upper surface 20a of the baffle plate 20. The functions of the recessed embossment 24 and the recessed area 25 will also be explained below.

The second component of the closure assembly 15 is a thermal barrier plate, indicated generally at 30. The thermal barrier plate 30 is disposed between the upper surface 20a of the baffle plate 20 and the lower surface 11b of the core 11. The overall size and shape of the thermal barrier 30 is generally the same as that of the baffle plate 20. The thermal barrier plate 30 is formed from a sheet of heat insulating material, such as a glass-filled, non-asbestos material, defining an upper surface 30a and a lower surface 30b. The thermal barrier plate 30 has a peripheral recessed edge 31 formed in the its upper surface 30a thereof. A plurality of cut-outs 32 are provided in the recessed edge 31. For reasons which will become apparent below, the cut-outs 32 are located so as to be generally aligned with the upwardly extending tabs 22 formed on the baffle plate 20.

Figures 3, 4, 5:
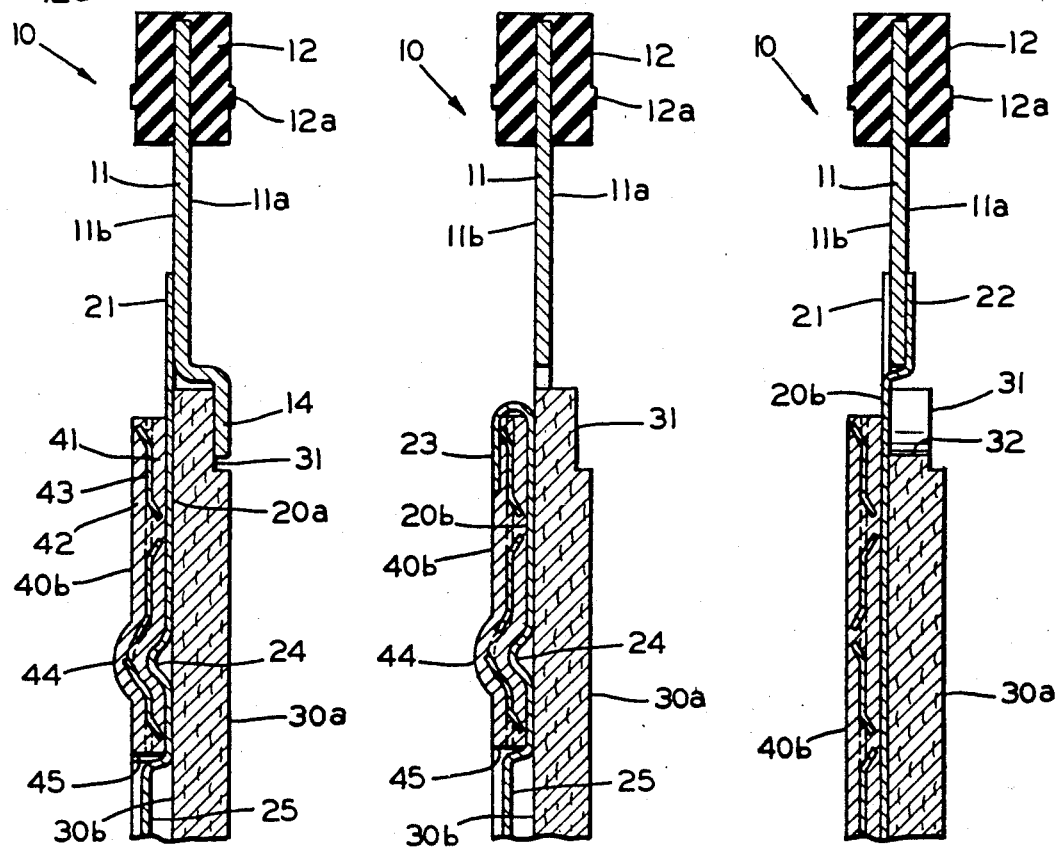
FIG. 3 is an enlarged sectional elevational view taken along line 3—3 of FIG. 2.
FIG. 4 is an enlarged sectional elevational view taken along line 4—4 of FIG. 2.
FIG. 5 is an enlarged sectional elevational view taken along line 5—5 of FIG. 2.

The third component of the closure assembly 15 is a sealing plate, indicated generally at 40. The sealing plate 40 is disposed adjacent to the lower surface 20b of the baffle plate 20. The overall size and shape of the sealing plate 40 is generally the same as that of the baffle plate 20 and the thermal barrier plate 30. As best shown in FIGS. 3 through 5, the sealing plate 40 is itself formed from a laminar construction. The sealing plate 40 includes first and second layers 41 and 42 of a material which is a relatively good heat conductor and which is resistant to degradation from high temperatures. Compressed graphite has been found to function satisfactorily for the layers 41 and 42. The layers 41 and 42 are secured to the opposed surfaces of a metallic core 43 in any conventional manner, such as by mechanical clinching.

The central portion of the sealing plate 40 is formed having a recessed embossment 44 formed therein. In the illustrated embodiment, the recessed embossment 44 extends generally in the shape of a square, although other shapes may be formed if desired. The recessed embossment 44 positioned so as to be co-extensive with the recessed embossment 24 formed in the baffle plate 20 when the closure assembly 15 is assembled, as described below. Within the recessed embossment 44, an opening 45 is formed through the sealing plate 40. The functions of the recessed embossment 44 and the opening 45 will also be explained below.

The closure assembly 15 is assembled by aligning the thermal barrier plate 30, the baffle plate 20, and the sealing plate 40 in overlapping relationship, as shown in FIG. 1, and moving them together. The upper surface 40a of the sealing plate 40 is moved into engagement with the lower surface 20b of the baffle plate 20. Then, the downwardly extending tabs 23 are bent inwardly over the outer peripheral edge of the lower surface 40b so as to secure the sealing plate 40 to the baffle plate 20.

Figure 2:
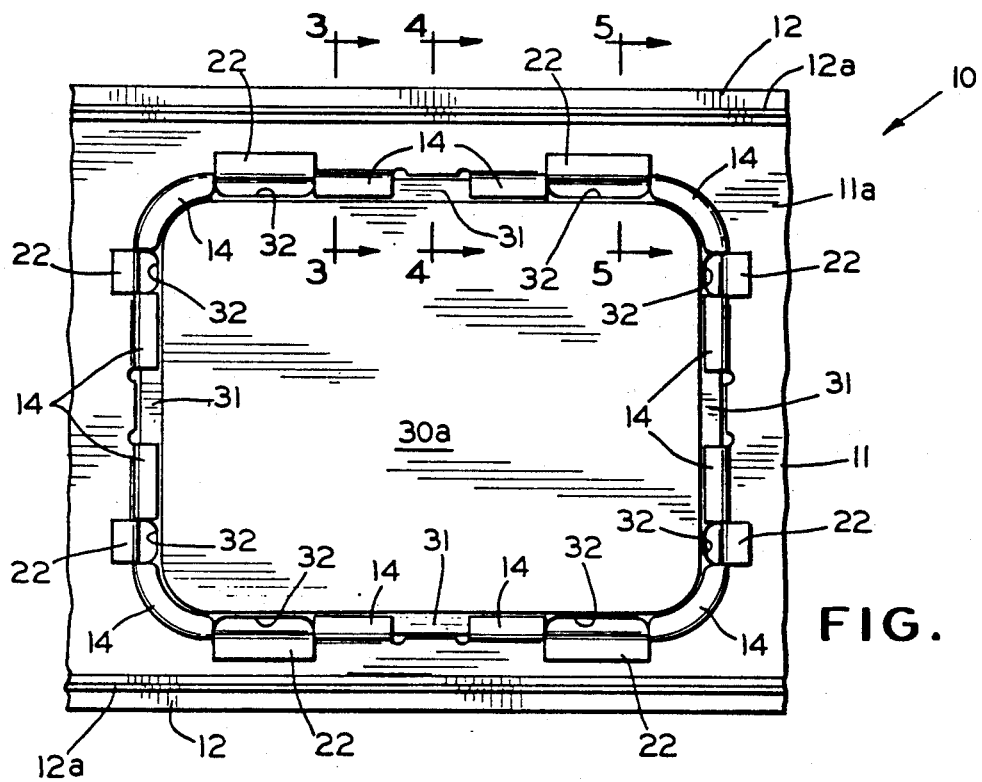
FIG. 2 is a top plan view of the gasket illustrated in FIG. 1 shown assembled.

Next, the lower surface 30b of the thermal barrier plate 30 is moved into engagement with the upper surface 20a of the baffle plate 20. As mentioned above, the cut-outs 32 formed through the outer peripheral recessed edge 31 of the thermal barrier plate 30 are aligned with the upwardly extending tabs 22 formed on the baffle plate 20. However, such tabs 22 are not bent over the thermal barrier plate 30. Rather, the entire closure assembly 15 is moved upwardly such that the upper surface 30a of the thermal barrier plate 30 engages the lower surface 11b of the core 11. The closure assembly 15 is received by the inwardly extending tabs 14 formed about the port 13. The upwardly extending tabs 22 of the baffle plate 20 extend through the port 13 above the upper surface 11a of the core 11. Lastly, such tabs 22 are bent outwardly over the upper surface 11a of the core 11, as shown in FIG. 2, so as to secure the closure assembly 15 thereto to form the gasket 10.

The assembled structure of the gasket 10 is more clearly illustrated in FIGS. 3 through 5. FIG. 3 illustrates how the tabs 14 and the outwardly extending tabs 21 function to position the closure assembly 15 relative to the core 11. Referring to FIG. 4, the downwardly extending tabs 23 are bent over to retain the sealing plate 40 to the baffle plate 20. Lastly, as shown in FIG. 5, the upwardly extending tabs 22 are bent over the upper surface 11a to retain the closure assembly 15 to the core 11.

Figure 6:
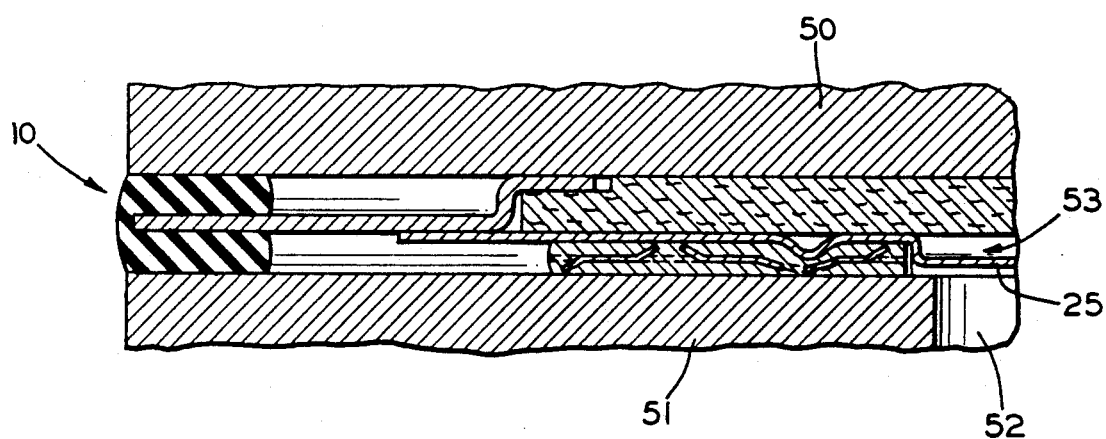
FIG. 6 is a view similar to FIG. 3 showing the gasket clamped between an intake manifold and a cylinder head of an internal combustion engine.

FIG. 6 shows the gasket 10 installed and compressed between an intake manifold 50 and a cylinder head 51, such as are commonly found in an internal combustion engine. The cylinder head 51 has a conventional exhaust gas recirculation passageway 52 formed therethrough. In the illustrated embodiment, however, the intake manifold 50 is formed from a plastic material. Therefore, as discussed above, the intake manifold 50 is not provided with a corresponding exhaust gas recirculation passageway.

When the gasket 10 is installed, the recessed embossments 24 and 44 surround the exhaust gas recirculation passageway 52, and the recessed area 25 is disposed thereover. The sealing bead 12 provides a relatively leak-proof seal about the periphery of the gasket 10. The embossments 24 and 44 are compressed somewhat between the intake manifold 50 and the cylinder head 51. As a result, a relatively leak-proof seal is created about the exhaust gas recirculation passageway 52. The bottom surface of the recessed area 25 of the baffle plate 20 provides a closure to prevent the hot exhaust gases from contacting the intake manifold 51.

The sealing plate 40 functions not only to seal the exhaust gas recirculation passageway 52, but also to conduct heat away therefrom. Such heat is conducted through the layers 41 and 42 of the sealing plate 40 to the cooler regions of the cylinder head 51 which are located away from the exhaust gas recirculation passageway 52. Most of the remaining heat generated by the hot exhaust gases present in the exhaust gas recirculation passageway 52 are dissipated in the thermal barrier plate 30 which, as mentioned above, is a relatively poor conductor of heat.

As best shown in FIGS. 3 and 4, the upper surface of the recessed area 25 of the baffle plate 20 is spaced apart from the lower surface 30b of the thermal barrier plate 30. This is because the recessed area 25 is recessed below the plane defined by the baffle plate 20. As a result, an air pocket, indicated generally at 53, is defined between the upper surface of the recessed area 25 and the lower surface 30b of the thermal barrier plate 30. The air contained in this pocket 53 functions as a further heat insulator to protect the intake manifold 50.

In accordance with the provisions of the patent statutes, the principle and mode of operation of this invention have been explained and illustrated in its preferred embodiments. However, it must be understood that this invention may be practiced otherwise than as specifically explained and illustrated without departing form its spirit or scope.

What is claimed is:

1. A gasket comprising:
   a body having first and second surfaces and a port formed therethrough;
   a closure assembly secured to said body to close said port, said closure assembly including a baffle plate extending completely across said port and having first and second surfaces; a thermal barrier plate formed from a heat insulating material and extending substantially completely across said port, said thermal barrier plate being disposed adjacent to said first surface of said baffle plate; a sealing plate formed from a material which is a relatively good heat conductor and which is resistant to degradation from high temperatures, said sealing plate being disposed adjacent to said second surface of said baffle plate; and means for retaining said thermal barrier plate and said sealing plate adjacent to said first and second surfaces of said baffle plate, respectively, wherein said closure assembly prevents the substantial transfer of heat from one side of said port formed through said gasket to the other side.

2. The invention defined in claim 1 wherein said baffle plate is formed having an area which is recessed below a plane defined by said first surface, whereby an air pocket is defined between said baffle plate and said thermal barrier plate.

3. The invention defined in claim 2 wherein said baffle plate is formed having a recessed embossment surrounding said recessed area.

4. The invention defined in claim 1 wherein said sealing plate is formed having an opening therethrough.

5. The invention defined in claim 1 wherein said retaining means includes a plurality of tabs formed on said baffle plate and extending over a portion of said thermal barrier plate to retain said thermal barrier plate adjacent to said first surface.

6. The invention defined in claim 1 wherein said retaining means includes a plurality of tabs formed on said baffle plate and extending over a portion of said sealing plate to retain said sealing plate adjacent to said second surface.

7. The invention defined in claim 1 wherein said securing means includes a plurality of tabs formed on said baffle plate, said tabs extending through said port and outwardly over a portion of said first surface of said body for securing said closure assembly adjacent to said second surface of said body so as to close said port.

8. A gasket comprising:
   a body having first and second surfaces and a port formed therethrough;
   a closure assembly secured to said body to close said port, said closure assembly including a baffle plate extending completely across said port and having first and second surfaces; a thermal barrier plate formed from a heat insulating material, said thermal barrier plate being disposed adjacent to said first surface of said baffle plate and extending completely across said port; a sealing plate formed from a material which is a relatively good heat conductor and which is resistant to degradation from high temperatures, said sealing plate being disposed adjacent to said second surface of said baffle plate;
   a first plurality of tabs formed on said baffle plate, said first plurality of tabs extending outwardly from said baffle plate and engaging a portion of said second surface of said body;

a second plurality of tabs formed on said baffle plate, said second plurality of tabs extending through said port and outwardly over a portion of said first surface of said body so as to retain said baffle plate and said thermal barrier plate adjacent to second surface of said body;

a third plurality of tabs formed on said baffle plate and extending over a portion of said sealing plate to retain said sealing plate to said baffle plate, wherein said closure assembly prevents the substantial transfer of heat from one side of said port formed through said gasket to the other side.

9. The invention defined in claim 8 wherein said body further includes a plurality of tabs formed thereon which extend inwardly over a portion of said port, said body tabs engaging said thermal barrier plate to retain said baffle plate and said thermal barrier plate to said body.

* * * * *